United States Patent [19]

McCombs et al.

[11] Patent Number: 4,561,865
[45] Date of Patent: Dec. 31, 1985

[54] SINGLE BED PRESSURE SWING ADSORPTION GAS SEPARATION SYSTEM

[75] Inventors: Norman R. McCombs, Tonawanda; Ravinder K. Bansal, East Amherst, both of N.Y.

[73] Assignee: Greene & Kellogg, Inc., Tonawanda, N.Y.

[21] Appl. No.: 547,494

[22] Filed: Nov. 1, 1983

[51] Int. Cl.⁴ .............................................. B01D 53/04
[52] U.S. Cl. ........................................... 55/25; 55/58; 55/68; 55/162; 55/189; 55/387
[58] Field of Search ......... 55/25, 26, 58, 62, 161–163, 55/189, 387, 389

[56] References Cited

U.S. PATENT DOCUMENTS

| | | | |
|---|---|---|---|
| 1,794,377 | 3/1931 | Hasche et al. | 55/58 |
| 2,273,350 | 2/1942 | Fry et al. | 55/58 X |
| 2,882,243 | 4/1959 | Milton | 55/75 X |
| 2,882,244 | 4/1959 | Milton | 55/75 X |
| 2,944,627 | 7/1960 | Skarstrom | 55/62 X |
| 2,955,673 | 10/1960 | Kennedy et al. | 55/163 |
| 2,978,407 | 4/1961 | Tuttle et al. | 55/58 X |
| 3,069,830 | 12/1962 | Skarstrom et al. | 55/58 |
| 3,104,162 | 9/1963 | Skarstrom | 55/58 |
| 3,138,439 | 6/1964 | Skarstrom | 55/33 |
| 3,147,095 | 9/1964 | Kanuch | 55/163 |
| 3,164,454 | 1/1965 | Wilson | 55/68 |
| 3,176,444 | 4/1965 | Kiyonaga | 55/58 X |
| 3,182,435 | 5/1965 | Axt | 55/162 |
| 3,237,377 | 3/1966 | Skarstrom | 55/58 X |
| 3,242,645 | 3/1966 | de Montgareuil et al. | 55/58 |
| 3,287,883 | 11/1966 | Mott | 55/163 X |
| 3,313,092 | 4/1967 | Potts | 55/163 |
| 3,399,510 | 9/1968 | Kauer, Jr. et al. | 55/163 X |
| 3,430,418 | 3/1969 | Wagner | 55/25 |
| 3,464,186 | 9/1969 | Hankison et al. | 55/163 |
| 3,472,000 | 10/1969 | Glass et al. | 55/163 |
| 3,636,679 | 1/1972 | Batta | 55/26 |
| 3,659,399 | 5/1972 | Kauer, Jr. et al. | 55/163 X |
| 3,696,588 | 10/1972 | Dussourd et al. | 55/163 |
| 3,834,136 | 9/1974 | Dussourd et al. | 55/163 X |
| 3,880,616 | 4/1975 | Myers et al. | 55/162 X |
| 3,934,989 | 1/1976 | Haugen | 55/163 |
| 4,194,890 | 3/1980 | McCombs et al. | 55/18 |
| 4,194,891 | 3/1980 | Earls et al. | 55/26 |
| 4,194,892 | 3/1980 | Jones et al. | 55/58 |
| 4,263,018 | 4/1981 | McCombs et al. | 55/18 |

*Primary Examiner*—Robert Spitzer
*Attorney, Agent, or Firm*—Roylance, Abrams, Berdo & Goodman

[57] ABSTRACT

A single bed PSA system having a high pressure compressor embodiment and a low pressure fan driven embodiment. Numerous features are disclosed, including a pressure response technique wherein the actual times of the steps within the cycle are adjusted in accordance with demand. Sub-atmospheric pressure is utilized to enhance the purging step of the single bed and to enhance efficiency as well.

14 Claims, 6 Drawing Figures

N.B. PRESSURES SHOWN ARE AT END OF STEP

N.B. PRESSURES SHOWN ARE AT END OF STEP

SINGLE BED PRESSURE SWING ADSORPTION GAS SEPARATION SYSTEM

FIELD OF THE INVENTION

This invention relates to pressure swing adsorption as used to separate mixtures of gases into their component parts.

More specifically, the invention has been developed in conjunction with such a system wherein air is separated into basically two streams, a first stream of primarily oxygen, and a second stream of primarily nitrogen. Usually, the first stream is used and the second stream is vented to atmosphere, but other arrangements are also possible.

Such systems and the apparatus used to carry them out have been used in a wide range of applications, including very large units that produce tons of oxygen per day as required for heavy industrial uses, such as petrochemical refinery processes and sewage treatment plants and the like. Much smaller units using pressure swing adsorption (hereinafter called "PSA") cycles have been embodied in much smaller pieces of equipment producing on the order of only a few liters of oxygen a minute as is needed in medical applications, particularly for patients with respiratory ailments.

Another general area of application of PSA technology has been in various medium size demand industrial applications. These include devices embodying PSA cycles which produce high purity oxygen for onsite production of oxygen in different areas, such as off-shore oil producing platforms. Another such industrial application is in automobile muffler shops wherein the stream of oxygen is used for feeding oxy-acetylene cutting torches.

In still other applications of PSA cycles and technology, other mixtures of gases can be separated into their component parts, and any selected gas can be utilized. For example, air can be separated so as to produce a stream of high purity nitrogen, the nitrogen being used as a shielding gas in certain welding applications or in other industrial applications. Further, carbon dioxide can be separated out of mixtures of industrial gases to preserve the carbon dioxide, or some other component gas. The field of application of PSA together with the present invention is not limited to producing streams of high purity oxygen, even though that is the embodiment which is described herein.

The present invention in all of its many embodiments is applicable to the entire field of PSA usage.

REFERENCE TO PRIOR PATENTS

There is a large body of patented art in the PSA area, and the following are set forth by way of more or less random examples of this prior art U.S. Pat. Nos.: 2,882,243; 3,138,439; 3,636,679; 2,882,244; 3,164,454; 4,194,890; 2,944,627; 3,237,377; 4,194,891; 2,978,407; 3,242,645; 4,194,892; 3,069,830; 3,430,418; 4,263,018; 3,104,162.

DISCUSSION OF PROBLEMS IN THE PRIOR ART

Some PSA techniques operate based on membranes or other selective separation means. The most popular type however, and the type into which the present invention falls, are those PSA techniques which are based upon a bed full of adsorbent material such as molecular sieves. The particular adsorbent material is selected to have a preference for a particular gas in the mixture of gases which constitutes the feedstock of the apparatus which embodies the cycle and system being carried out. When it is desired to produce oxygen out of air, as a very great simplification of an otherwise highly complex physical chemistry system, the adsorbent material preferentially holds back the nitrogen permitting the oxygen to flow through the bed more rapidly and thus exit as a relatively high purity stream of oxygen. It is later necessary, when the bed of adsorbent material is saturated with nitrogen, to depressurize and back-flush the bed with oxygen thus venting the nitrogen to prepare the bed to again separate oxygen out of the feedstock.

Within this general category of adsorbent bed-type PSA devices and systems, the prior art teaches those which use multiple bed and those which use a single bed. Where production is continuous, it is highly advantageous to use at least two beds, one bed being on production while the other bed is being back-flushed, so that the system overall continuously produces oxygen. A side stream of the product from the bed on production is used as the back-flush stream for the bed on regeneration.

However, in some applications a single bed is highly desirable. The single bed system has a great advantage in that it is of lower cost, higher reliability because of the greatly reduced number of parts in the apparatus carrying out the cycle, and lower weight. Even if the demand is more or less continuous, the intermittent production from the single bed type of system, which includes the present invention, can be made to function more or less continuously by the addition of a surge tank in the apparatus. This feature is used in the present invention, but several variations are applied thereto which constitute part of the improvement of the present invention over the prior art.

A common problem in the prior art of single bed PSA systems has been that there has been a substantially 50% loss of compressor capacity. That is, when the compressor is providing air to the adsorption bed in the production cycle, the compressor capacity is being usefully employed. However, when the bed is on the regeneration portion of the cycle, the compressor capacity is often simply vented or otherwise wasted. Alternatively, the compressor could be started and stopped, but this is, of course, extremely rigorous service for the compressor and correspondingly shortens its life. Further, there are many mechanical and technical problems in repeatedly starting and stopping the compressor in a PSA cycle. Where a central source of compressed air is utilized, as, for example, where there are many needs for compressed air in a single facility, such as a large muffler shop having many service bays, then this problem is alleviated because the central compressed air supply has its own surge tank, and the air is being used in one place if not in another. However, even in that environment the invention in one of its forms provides an advantage in that the single bed system is readily accommodated, thus yielding to the user the advantages inherent in single bed systems.

In many situations, where there is a central air supply, the PSA apparatus tends to be multi-bed, and thus large. Thus, the invention provides another step forward in that it teaches a method of using a single bed PSA apparatus in a multi-user facility having a central compressed air supply.

It has also been common in the prior art to operate the PSA cycle between atmospheric pressure and a pressure above atmospheric pressure, i.e. the working pressure of the compressor. The present invention, in one of its facets, is based on the discovery that the particular cycle used in a single bed PSA system of the invention operates more efficiently when functioning between a pressure below atmospheric. This increase in efficiency of operation is another advantage of the present invention over the prior art. This was an unexpected advantageous result.

The present invention overcomes numerous other problems in the prior art by its teaching of several unique combinations of cycles and features which provide advantages in the PSA art, and particularly as related to single bed adsorption systems.

ADVANTAGES AND SUMMARY OF THE PRESENT INVENTION

A primary facet of the present invention is the teaching of a unique PSA cycle particularly adapted for single bed adsorption systems. This is set forth in greater detail below.

There are basically two embodiments in which the cycle is utilized, and several features and combinations of these features applicable to the two different embodiments.

The two embodiments, as a matter of convenience, can be thought of as the high pressure version and the low pressure version.

The high pressure version depends upon a conventional supply of compressed air. This can be either a dedicated compressor forming part of the apparatus into which the PSA cycle is built, or it can be a central source of compressed air as is commonly found in multi-use facilities.

The second so-called low pressure embodiment includes a blower as the source of the feedstock gas. A particularly unique facet of this application which is built around the relatively low pressure blower is the utilization of both the output super-atmospheric pressure side and the intake sub-atmospheric pressure side of the blower. These two pressures are used at different points in the cycle to great advantage. The advantages include that the blower is being utilized 100% of the time and is permitted to operate continuously. This is to be compared with prior art single bed systems wherein the compressor or pressurized air supply is wasted for approximately 50% of the cycle, i.e. during bed regeneration.

In addition to the two primary embodiments, the present invention also teaches a number of features which are in some cases applicable to both embodiments and in some cases applicable to only the high pressure version.

These features include means to cause the apparatus embodying the system and cycle to operate only upon demand. This is a substantial step forward in the art. Heretofore, PSA apparatuses often included a timer which operated irrespective of demand. That is, once the machine was turned on, it would perform the first step for so many seconds, the next step for so many seconds, etc., and would continue to cycle in this same manner irrespective of whether or not there was any demand, and irrespective of the amount of the demand. In the present invention, a pressure sensor switch is provided in close association with the output holding tank in order to control the cycle in accordance with demand. Thus, the times of each step in the cycle can vary considerably, and will vary as a function of the size of the adsorber bed, the capacity of the feedstock blower, as well as the quantity of the demand. This demand responsive means is applicable to both embodiments of the invention.

A significant advantage for the invention in this regard is that the cost, assembly time, weight, and other facets inherent in using such a timer, often a cam timer or an electronic timer, is completely eliminated.

Yet another advantage for this second embodiment is that the relatively simple low pressure blower is a much less expensive and less complicated component that a conventional air compressor with its many moving parts.

Another facet of the invention which is applicable to both the high pressure and low pressure embodiments, is an arrangement of dual tanks, a first tank being provided to supply purge and/or equalization gas within the system, and a second one as a supply holding tank in order to ensure a constant surge-free supply to the user. A check valve arrangement is included in order to assure this modus operandi.

The following feature is applicable to only the high pressure first embodiment. This feature includes a feed valve located essentially at the input of the supply pressurized air to the system. This valve is not desirable where the system is working with a dedicated compressor, a compressor which is built in or has no function other than feeding the invention apparatus, because then it is important to unload the compressor when the bed is on regeneration in order to avoid having the compressor work against a closed valve. Such a configuration, that is the compressor working against a closed valve, would rapidly injure the compressor. Further, by unloading the compressor, it consumes less energy, which is another advantage of the invention. This facet, per se, has the disadvantage however, in common with the prior art, of wasting compressor capacity. This feed valve facet is not needed where the invention is used in a multi-use facility, i.e., a central compressor, since then the compressor will never be operating against a closed valve but will be feeding a central supply tank.

As stated above, the present invention is based in part on the discovery that operating a PSA cycle between sub-atmospheric and super-atmospheric pressures, as opposed to between atmospheric and super-atmospheric pressure as is common in the prior art, produces a more efficiently operating cycle. In the second embodiment this is achieved by use of both sides of the blower. Even in the first embodiment, this modus operandi may be achieved by the inclusion of a venturi positioned at the waste gas exit of the single bed and driven by the relatively high pressure air of the feedstock in order to create a sub-atmospheric condition at this exit, which then literally sucks the waste gas out of the bed without the use of any separate source of vacuum pressure.

Yet another feature of the invention has to do with the common element in prior art apparatuses of a heat exchanger. In effect, if a volume containing sufficient mass with proper heat transfer and heat capacity characteristics is included such that the heat laden feed air must pass through it and subsequently the waste nitrogen in the reverse direction, a thermal equilibrium will be established which eliminates or reduces the need for a feed air heat exchanger. This technique also potentially eliminates the need for a separate $H_2O$ separator.

The above and other advantages of the invention will be pointed out or will become evident in the following detailed description and claims, and in the accompanying drawing also forming a part of the disclosure.

DETAILED DESCRIPTION OF THE PREFERRED EMBODIMENTS

Figure 1:
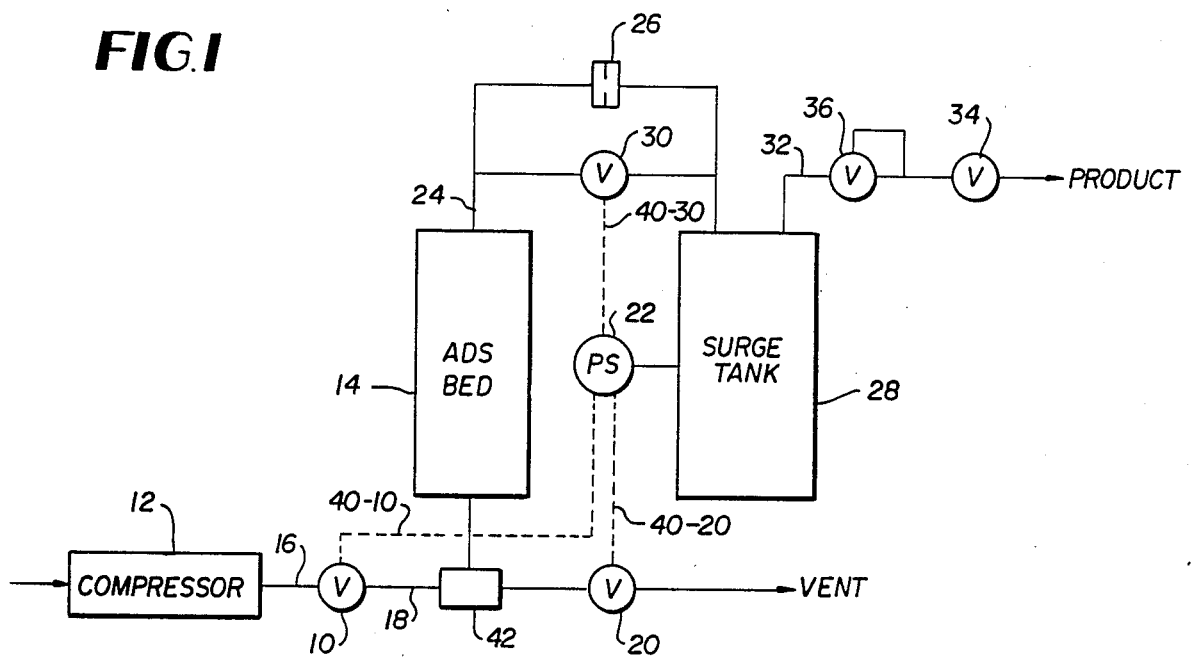
FIG. 1 is a schematic diagram of the first embodiment of the present invention.
Figure 2:
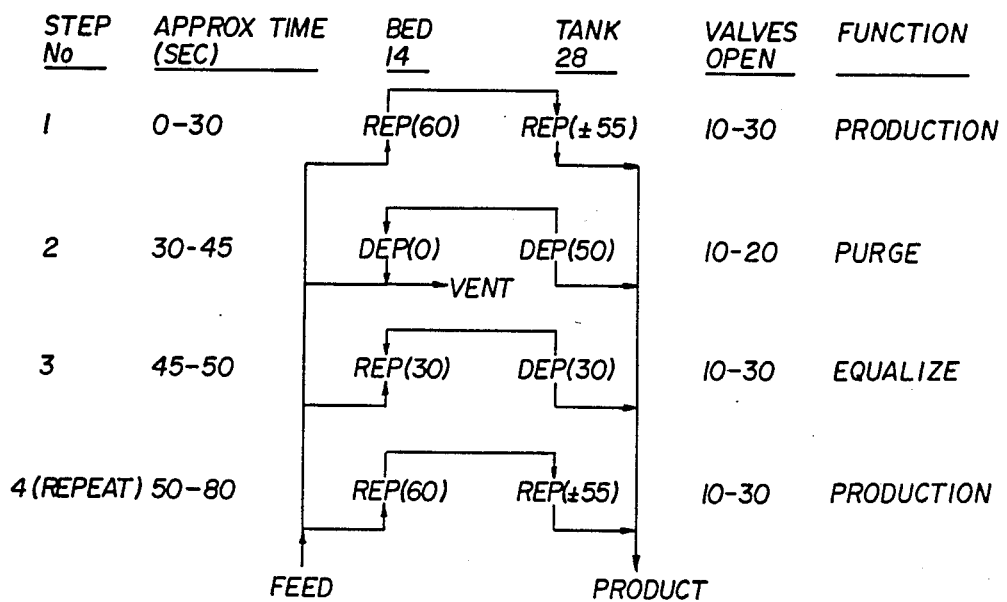
FIG. 2 is a chart illustrating the cycle and other facets of the first embodiment of FIG. 1.
Figure 3:
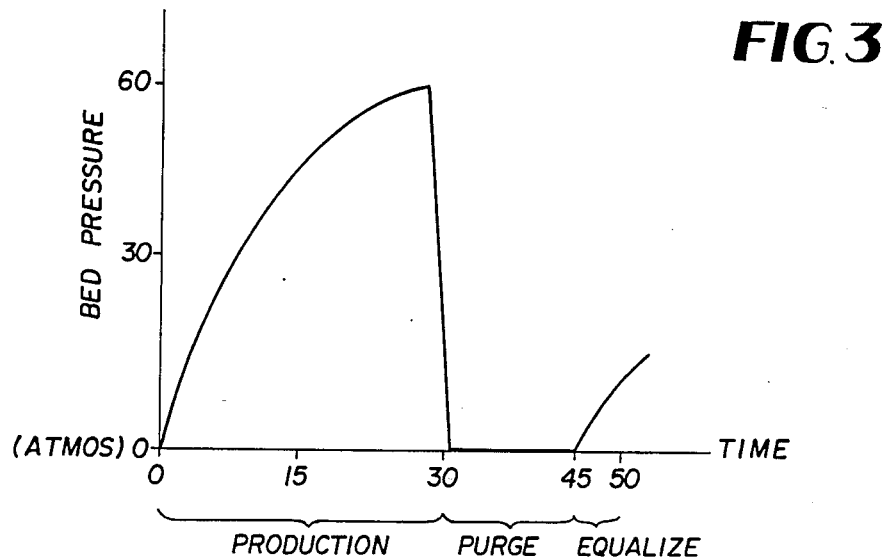
FIG. 3 is a pressure chart showing the performance of the bed in the first embodiment.

Referring first to FIGS. 1, 2 and 3, there is shown a first embodiment of the invention which comprises a compressor 12, the output of which feeds through a valve 10 to the single PSA bed 14 of the invention. The compressor 12 is of a relatively high output pressure, on the order of 60 psig. All pressures discussed herein and shown in the drawings are gauge pressures, atmospheric pressure being considered zero. The compressor 12 is dedicated to the system of FIG. 1, that is, it is a separate compressor which may be self-contained in the apparatus, but which has no function other than to feed the bed 14. This is to be compared with mutli-use facilities, as described above, wherein a single large compressed air source serves several "consumers".

In some prior art systems, which purport to be dedicated systems, there is a surge tank in the position of valve 10 in FIG. 1. This does permit bleeding off from the surge tank for other uses, but has the same disadvantage of wasted compressor capacity and expense and the like, since the compressor is always working against the relatively high pressure in such a surge tank. One would therefore only use the surge tank at the output of the compressor if one had other use for the air. However, if one has other uses for the air, then it is not really a dedicated system in the sense that that term is used herein.

A variation of this first embodiment is a configuration wherein the valve 10, the feed valve, is omitted entirely. When that valve is omitted, then the opening of valve 20 in the purge step 2 allows the adsorber to depressurize to atmospheric, and at the same time the output of the compressor is unloaded or vented to atmosphere. Thus, with the valve 10 omitted in FIG. 1, the compressor never works against a closed valve, since so long as the system is cycling, the output of the compressor will either be vented through valve 20 or will be used to feed the bed 14, since valve 30 is open. That is, looking at the "valves open" column of FIG. 2, one of valve 20 or valve 30 is always open, and thus the compressor never works against a closed valve.

In such case, that is, the omission of valve 10, the invention prevents the compressor from working against a closed valve in all situations. At the same time, by unloading the compressor, less energy is consumed, since the compressor at the time the purge valve 20 is open, is simply outputting to atmosphere rather than against a load. In high pressure systems without a dedicated compressor, then valve 10 would be included to isolate the air supply and save feed air.

Valve 10, when used, is a normally closed type. To repeat, it is not used with a dedicated compressor. If for some reason it were used with a dedicated compressor it would remain energized, fully open throughout the cyclic process.

Thus, the compressor 12 supplies air via line 16 alternately to bed 14 or to vent via line 18 and valve 20. Another line 24 exits from the opposite end of bed 14 through valve 30, similar to valve 20, to feed surge tank 28. A purge limiting orifice 26 is connected in parallel to valve 30. The final output of product is via line 32 controlled by throttle valve 34 and pressure regulator 36.

The valves 10, 20 and 30 are controlled by the pressure element 22 or a preset timing device via dotted control lines 40-10, 40-20 and 40-30 respectively.

The use of pressure switch 22 is a material step forward since it can eliminate the need for costly timing devices and allows for automatic turndown of the compressor with demand. That is to say, the compressor will only be required to supply pressurized air in response to product use.

The following example is offered for clarification: The pressure switch 22 is of the adjustable reset differential type. In operation, if its upper setpoint is 60 psig it will switch electrical position at that point. If its preset point is 55 psig the pressure in surge tank 28 must drop to this point to reset pressure switch 22. In normal operation pressure switch 22 will allow for valve 20 to be closed and valve 30 open during the pressurization of bed 14 and surge tank 28. When pressure builds to the set point 60 psig of pressure switch 22 the valve position will reverse opening valve 20 and closing valve 30. Bed 14 will then depressure to the atmosphere and a back purge of product gas will begin through orifice 26 slowly depressurizing surge tank 28. If no product is removed through throttle valve 34 it will take approximately 5 minutes, for example, to reach the 55 psig lower set point of pressure switch 22. During this time the compressor is venting through valve 20 drawing minimum electrical power. If the pressurization time was only 15 seconds and the purge (minimum power) interval 5 minutes one realizes a "turndown" of 300/315 or 95% at no product load. This is not to say the power consumed is only 5% of rated but, that for 95% of the time the compressor is unloaded drawing its zero load power. This zero load power varies from 15% of rated and up depending upon the compressor type chosen.

This 95% turndown may be realized for the no load condition depending upon an optimization of the purge orifice 26 diameter. As product gas is withdrawn from surge tank 28 in addition to purge gas the pressure in the surge tank drops more rapidly. At rated product flow for example the 55 psig reset point may be reached in 15 seconds. Thus the turndown ratio at rated or maximum product flow might be 15/30 or 50%.

It should be recognized in an application of varying product demand substantial power savings can be realized.

As mentioned earlier, a pre-set timer can be used in place of pressure switch 22 but must be set so as to fulfill the time requirements at full product load.

As described in greater detail below, the invention includes two additional features which are also usable at the discretion of the user in the apparatus of FIG. 1.

These two features are the Venturi waste extraction 42, and the additional tank 56 and check valve 54 (see FIG. 4) to assure a smooth supply.

Optional Venturi extractor 42 operates to create a local low pressure vacuum assist on the purge step by utilizing the otherwise vented compressor output. That is, in step 2, the purge step, the output of the compressor is simply vented through Venturi 42. Thus, the compressed air will exit through the line 18 and valve 20, but by way of the Venturi device 42 which will help and speed the purge step by sucking the waste gases, primarily nitrogen, out of bed 14. As discussed in greater detail below in regard to the second embodiment, it has been unexpectedly found that operating between a pressure above atmosphere and a pressure below atmosphere has enhanced the efficiency and operability of cycles so operating. This is to be compared with the conventional prior art wherein such systems are operated between atmospheric pressure and pressures above atmospheric pressure.

Turning now to FIG. 2, as described above, the time for each step is merely approximate. These times will be adjusted in response to the actual demand experienced by the system as described above with regard to pressure switch 22.

The cycle includes three steps, step "4" is really the beginning of another cycle and is identical to step 1. As indicated at the bottom of FIG. 2, the pressures indicated are at the end of each step, and are gauge pressures, atmosphere being zero. Step 1 is a production step, the bed is producing oxygen which is being sent through the open valve 30 to the tank 28. This continues until the pressure in the tank 28 comes to the preset switch-over point, 55 psig in the example being discussed. At that time, the cycle advances to step 2 wherein a side stream operating through the orifice 26 is permitted to pass backward through the bed 14, downwardly in FIG. 1 to backflush the nitrogen out of the bed, line 18, extractor 12 now open valve 20, and to atmospheric vent.

This step continues for a relatively short period of time, 15 seconds in the example being discussed. The next step 3 is an equalizing step, wherein valve 20 is closed, valve 10 is then re-opened to supply feed gas to the bed 14, and the system re-pressurizes until equalization. Upon equalization, the flow automatically reverses through the line 24 and the now open valve 30, to commence production, steps 1 and 4.

Referring to FIG. 3, the pressure in the bed 14 through the cycle is shown. It is significant that the very sharp and steep drop that occurs at the 30 second point, that is at purge, occurs very rapidly. This allows for more efficient use of purge gas.

The steep drop is achieved by the use of relatively large values to get this fast blow down.

As is clear from FIGS. 1 and 2 and the preceding description, as a summary, it can be seen that the valve 20 is dual purpose. During purge step 2, in this first high pressure compressed gas embodiment, valve 20 permits both de-pressurization of bed 14 down to lowest pressure (which is atmospheric as shown in FIG. 2 or can be sub-atmospheric if the optional Venturi waste gas extractor 42 is in use), and also venting of the output of compressor 12. Both the bed "blow-down" and compressor "dumping" functions are performed simultaneously and through this single valve 20.

This double service of valve 20 is another important step forward of the invention and further enhances its advantages of lower cost, fewer parts, higher reliability, reduced weight, lower manufacturing cost, and the like, as compared to the prior art.

Figure 4:
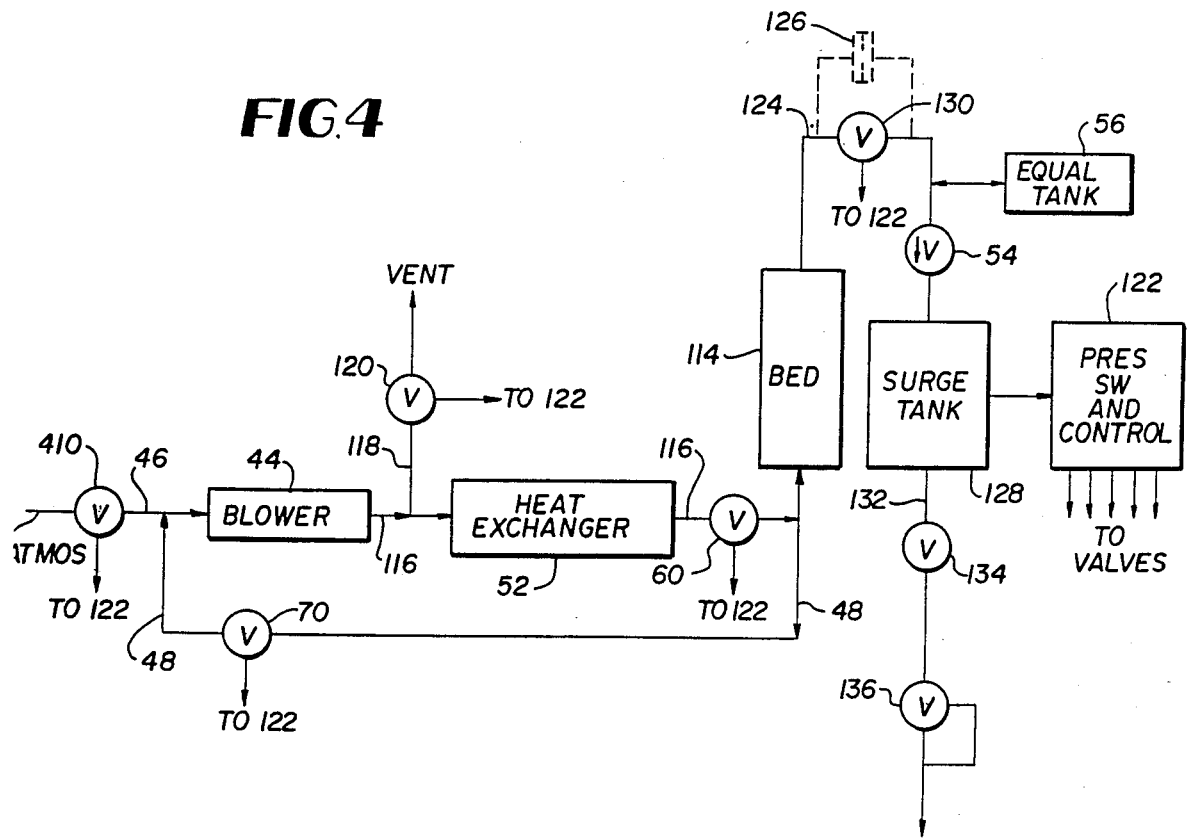
FIG. 4 is a view similar to FIG. 1 schematically illustrating a second embodiment of the present invention.

Referring now to FIG. 4, the second embodiment is set forth in detail. Parts the same as, equivalent to or similar to those described above in regard to FIG. 1, are indicated by the same reference numeral, raised by 100.

The embodiment of FIG. 4 is built around a blower 44 which may be in the form of anyone of various different types.

FIG. 3 illustrates the changes in pressure in the bed 14 and is directly correlatable to the cycle chart of FIG. 2. FIG. 3 is relatively self-explanatory, the steep drop from full pressure to the purge pressure at about the 32 second point is readily discernable.

Referring now to FIG. 4, this low pressure version is built around the blower 44, as discussed above. Atmospheric air is sucked in on the intake side of the blower via a line 46, the flow of atmospheric air through which is controlled by a valve 110 which is controlled by the pressure switch and control element 122. Between the intake side of the blower 44 and the valve 110 a line 48 enters the line 46 as an alternative to feed air to the intake side of the blower. The flow through line 48 is controlled by a valve 70 which is in turn controlled by element 122.

The output or super-atmospheric side of the blower 44 delivers its outflow via a line 116 which enters a heat exchanger 52. The system vent line 118 "tees" off of line 116 between the blower 44 and the heat exchanger 52. The venting is controlled by valve 120 which is controlled from element 122.

After heat exchanger 52, the flow in line 116 is controlled by valve 60 which feeds into line 48 which feeds back to the intake side of the blower 44, as shown. In addition, the valve 60 in line 116 controls the flow into the inlet side of the bed 114.

The flow in the bed output line 124 is controlled by valve 130 which in turn is controlled by element 122. The orifice 126 is indicated in dotted lines, as it is an optical feature in this FIG. 4 embodiment.

Because a single bed PSA system is susceptible to surging and irregularities in the flow of output product, the invention includes an optical feature to provide a constant supply and to smooth the delivery of product. To this end, there is provided a check valve 54 in the line 124, and an equalization tank 56 between valves 54 and 130. The equalization tank 56 tees into the line 124 between these two valves 130 and 54.

After surge tank 128, the components are the same as those described in the FIG. 1 embodiment, the reference numerals having been increased by 100.

Figure 5:
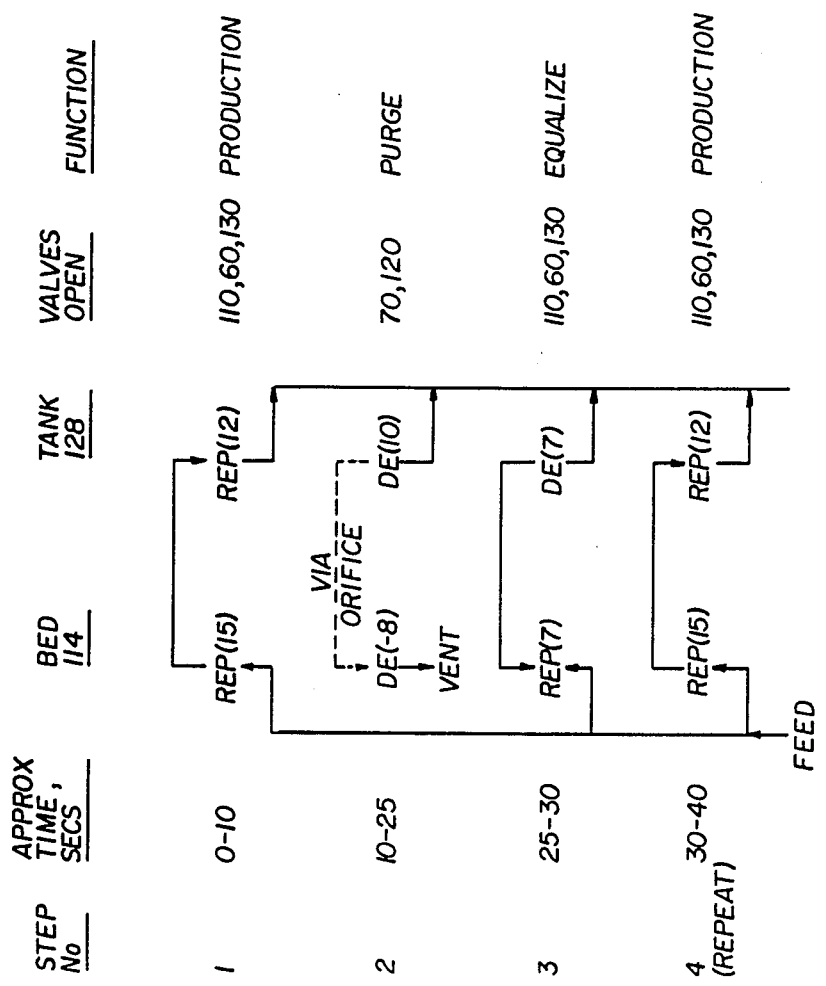
FIG. 5 is a cycle chart similar to FIG. 2 but illustrating the performance of the second embodiment.

Referring now to FIG. 5, a cycle chart for the FIG. 4 apparatus is shown. This cycle chart corresponds generally to the first embodiment of the invention system shown in FIG. 2. In common therewith, the times illustrated are approximate only, the times of course will be controlled by the pressure switch and control means 122, in the same manner as described above in regard to the similar component 22 in FIG. 1.

In the first step, the system is on production, valve 110 is open and valve 70 is closed, and the blower 44 is thus sucking in atmospheric air. Valve 120 is closed, and thus the flow proceeds through the line 116 and the open valve 60 to the bed 114 which produces product gas. The valve 130 is open to permit the product gas to pass on to the equalization tank 56 and the surge tank 128. The check valve 54 serves the function of preventing a back-flow out of the surge tank when the cycle proceeds to the next step 2, the purge. The equalization tank 56 will thus supply gas for this purpose, and the check valve 54 will isolate the surge tank 128 for purposes of serving the consumer. Since the tanks 56 and 128 are equally pressurized, the outflow from the tank 56 cannot open the check valve 54 against the equal pressure in the tank 128, and thus that gas is used for purging the bed 114.

In the purge step 2, valves 110, 60, and 130 close, and valves 70 and 120 open, and thus the blower draws air from the equalization tank 56 through the orifice 126, backward through the bed, backward through the valve 70 and to the intake side of the blower 44, and thence out through the now open vent valve 120.

Figure 6:
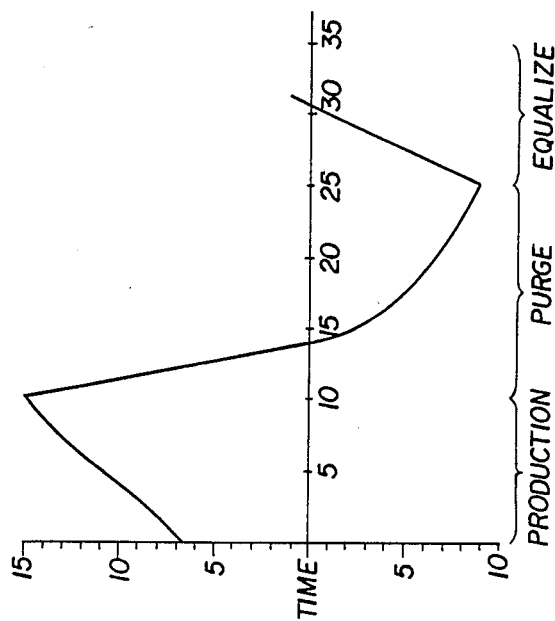
FIG. 6 is a pressure performance curve similar to FIG. 3 but illustrating the performance of the second embodiment.

Thus it can be seen how the blower 144 operates in a 100% efficient manner, that is, it operates continuously. In the first step it is providing super-atmospheric air which is fed to the bed 114. In the next purging step, the intake side of the blower 44 is utilized, and the waste gases are literally sucked out of the bed 114 and sent to atmosphere through the vent valve 120. Further, it should be noticed that, and this is more clearly shown in FIG. 6, the purge step is performed starting at a super-atmospheric pressure of 15 psig and proceeds down to a sub-atmospheric pressure of minus 8 psig. It has been found that operating between a super-atmospheric pressure and a sub-atmospheric pressure enhances the operating efficiency, output in general, and generally enhances the PSA cycle thus operated. This improvement is deemed a substantial step forward over the prior art, especially when coupled with the low cost, low pressure blower 44 of this embodiment of the invention.

Returning to FIG. 5, the third equalization step occurs after purge, the valves 110, 60, and 130 re-open, and either the equalization tank 56 if present or else the surge tank 128 is used to re-pressurize the bed 114 together with the feeding in of fresh feedstock from blower 44. After equalization is achieved, the cycle automatically progresses to the next step 4, which is step 1 again, and both the bed and the tank are repressurized and production continues.

While the invention has been described in detail above, it is to be understood that this detailed description is by way of example only, and the protection granted is to be limited only within the spirit of the invention and the scope of the following claims.

What is claimed is:

1. A PSA system having a single bed, said system including a PSA cycle, means to cause said cycle to operate said single bed between highest pressure, lowest pressure, and intermediate pressure, said system including tank means for receiving the output of product gas from said single bed, said system comprising control means, said control means causing said cycle to perform a production step wherein the pressure in said bed and said tank means are increased from said intermediate pressure to said highest pressure, said control means causing said cycle to perform a purge step wherein the pressure in said bed is decreased from said highest pressure to said lowest pressure, conduit means containing valve means interconnecting said single bed and said valve means, and said control means causing said last mentioned valve means and said cycle to perform a pressure equalization step wherein the pressures in said bed and said tank means are equalized at said intermediate pressure.

2. The system of claim 1, wherein said lowest pressure in sub-atmospheric.

3. The system of claim 2, and blower means to create both said highest pressure at the outlet side of said blower means and said lowest pressure at the intake side of said blower means.

4. The system of claim 1, and means to cause said pressure decrease in said bed during said purge step to occur rapidly.

5. The system of claim 1, compressed air supply means, Venturi waste gas extractor means, and means to flow compressed air from said supply means through said waste gas extractor means to cause said Venturi extractor means to draw waste gas out of said single bed.

6. The system of claim 1, and a normally closed feed valve upstream of said single bed.

7. The system of claim 1, and timer means for controlling the duration of each step in said cycle.

8. The system of claim 1, and pressure equalization tank means associated with the output of product gas from said single bed.

9. The system of claim 1, wherein air is the gas operated upon by said PSA cycle, and wherein oxygen is the product gas.

10. The system of claim 1, heat exchanger means, and means to so position said heat exchanger means that a heat exchange occurs between gas fed to said single bed and purge gas directed away from said single bed.

11. A pressure swing process for fractioning at least one component gas from a mixture of gasses by selective adsorption in only a single adsorption zone and utilizing tank means to receive the output of said at least one component gas from said single adsorption zone, comprising the steps of operating said single adsorption zone between highest pressure, lowest pressure and intermediate pressure, the process including a production step wherein the pressures in said zone and in said tank means are increased from said intermediate pressure to said highest pressure, a purge step wherein the pressure in said zone is decreased from said highest pressure to said lowest pressure, and a pressure equalization step wherein the pressures in said zone and in said tank means are equalized at said intermediate pressure.

12. The method of claim 11, and the step of performing a heat exchange between the mixture of gasses fed to said zone and the purge gas directed away from said zone.

13. The method of claim 11, and the step of causing said lowest pressure to be sub-atmospheric.

14. The method of claim 11, wherein said mixture of gasses is air and said at least one component gas is oxygen.

* * * * *